Nov. 25, 1952     T. R. SOUREK     2,618,880
REEL COVER
Filed Jan. 28, 1947

T. R. Sourek
Inventor

By Knowles
Attorneys.

Patented Nov. 25, 1952

2,618,880

UNITED STATES PATENT OFFICE 2,618,880

REEL COVER

Theodore R. Sourek, Duluth, Minn.

Application January 28, 1947, Serial No. 724,875

1 Claim. (Cl. 43—26)

This invention relates to reel covers, and more particularly, has reference to reel covers formed of fabric material or the like, that are adapted to be fitted over a fishing rod handle and reel mounted thereon.

The primary object of the invention is to provide a cover of the character described which can be fitted over the handle of a fishing rod easily, quickly, and without the necessity of removing the reel from the rod.

It is a further object of the invention to provide a cover of this type which can be constructed extremely inexpensively, but which will nevertheless be fully efficient in protecting a reel from dust, sand, and other foreign elements.

It is well known that on fishing trips, the fisherman often prefers to keep his reel mounted on its rod, for obvious reasons of convenience. Often, the rod is dropped to the ground, by accident, or, it may be that the fisherman desires to place his rod on the ground. On such occasions, dirt may get into the reel, causing loss of time to the fisherman while he cleans the reel, or even destroying the efficiency of the reel permanently.

The invention herein described is intended to eliminate these difficulties, by the provision of a cover of fabric or other flexible material novelly designed to fit over a reel and to be contracted on either side thereof for the purpose of preventing the admission of foreign elements.

In view of the foregoing and other objects in view of which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
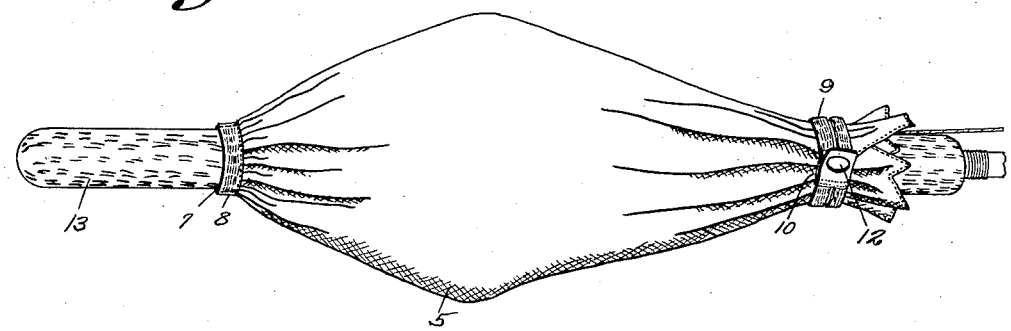
Figure 1 is a perspective view of the handle portion of a fishing rod to which a cover constructed in accordance with the invention has been applied, the cover enveloping the reel seat and reel carried by the rod.
Figure 2:
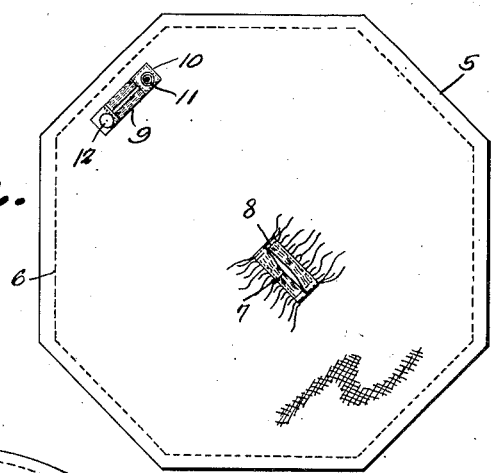
Figure 2 is a plan view of the cover, the figure showing one embodiment thereof wherein the cover is formed in a polygonal shape.
Figure 3:
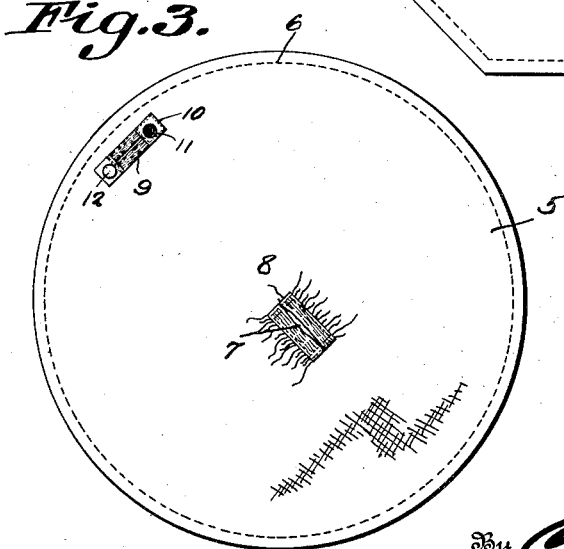
Figure 3 is a plan view of another embodiment of the cover, wherein the cover is formed circularly.

Referring to the drawing in detail, the reference character 5 denotes the cover generally, the cover being formed of any suitable material having sufficient quality of flexibility, such as cloth, rubber, or the like. Preferably, the material is of a waterproof nature.

As shown at 6, the edge of the cover is hemmed, or alternatively, it may be suitably bound by any well-known means.

Spaced slightly from the center of the cover is an opening 7, that is preferably in the form of a slit, although it may be of any other form sufficient to permit the handle of a fishing rod to be received therein.

This opening is surrounded by a binding 8 of elastic quality, that is adapted to hold the edges of the opening in yielding but snug engagement with the handle of the rod.

At any desired location adjacent the periphery of the cover, is secured an elastic band 9, one end of which is sewed to the cover together with a tab 10 carrying a cooperating part 11 of a snap fastener. The other end of the band 9 is free, and carries the other cooperating part 12 of the fastener.

In use of my device, the handle 13 of a fishing rod is inserted through the opening 7 of the cover, and the cover moved up on the handle to a point preferably immediately rearward of the reel seat. The edge of the cover is then extended forwardly so as to envelope the reel seat and reel of the rod, the edge being then gathered around the handle forwardly of the reel. The elastic band 9 with its snap fastener, is then applied to maintain the cover in protective closed position.

Importance is attached to the construction of the cover, wherein the opening 7 is formed therein so as to be slightly off center. This compensates for the asymmetric nature of the object to be covered, that is, a reel mounted on one side of the handle of a rod. Thus, more material is available to cover the reel, with the edge of the cover still being maintained in even relation at the point at which it is secured to the handle by means of the band 9.

What is claimed is:

In fishing equipment of the type which includes a rod having a handle and a reel carried by the rod adjacent the handle, means for protecting the reel comprising a sheet of flexible material having an eccentrically located slit extending therethrough for receiving the handle, an extensible elastic binding carried by the sheet and bordering the slit for tightly gripping the handle, an elongated strap of extensible elastic material attached adjacent one end to the sheet adjacent the edge thereof furthest from the slit for encircling the rod and portions of the sheet remote from the slit, and a separable fastener carried by the sheet and by the strap for releasably holding the sheet in enclosing relation to the reel and portions of the rod and handle.

THEODORE R. SOUREK.

REFERENCES CITED

The following references are of record in the file of this patent:

UNITED STATES PATENTS

| Number | Name | Date |
|---|---|---|
| 295,586 | Ross | Mar. 25, 1884 |
| 1,269,276 | Harris | June 11, 1918 |
| 1,489,704 | Kleshick | Apr. 8, 1924 |
| 1,490,283 | Loeffelholz | Apr. 15, 1924 |
| 1,492,725 | Henry | May 6, 1924 |
| 1,535,312 | Hosking | Apr. 28, 1925 |
| 1,633,988 | Jones | June 28, 1927 |
| 1,785,561 | Riley | Dec. 16, 1930 |
| 1,827,654 | Harper | Oct. 13, 1931 |
| 2,051,750 | Siers | Aug. 18, 1936 |
| 2,154,772 | Rathemacher | Apr. 18, 1939 |

FOREIGN PATENTS

| Number | Country | Date |
|---|---|---|
| 20,293 | Australia | June 10, 1905 |
| 39,851 | Switzerland | May 25, 1907 |
| 701,657 | France | Jan. 12, 1931 |